United States Patent
Oku et al.

[11] Patent Number: 5,148,090
[45] Date of Patent: Sep. 15, 1992

[54] VARIABLE RELUCTANCE TYPE AC SERVO MOTOR

[75] Inventors: Hideaki Oku; Takeshi Nakamura, both of Yamanashi, Japan

[73] Assignee: Fanuc Ltd., Yamanashi, Japan

[21] Appl. No.: 476,446

[22] PCT Filed: Sep. 28, 1989

[86] PCT No.: PCT/JP89/00981
§ 371 Date: May 23, 1990
§ 102(e) Date: May 23, 1990

[87] PCT Pub. No.: WO90/03685
PCT Pub. Date: Apr. 5, 1990

[30] Foreign Application Priority Data

Sep. 28, 1988 [JP] Japan ................. 63-240945

[51] Int. Cl.⁵ ............................... H02P 7/36
[52] U.S. Cl. ................... 318/107; 310/106; 310/276; 310/254; 310/269
[58] Field of Search .......... 310/269, 216, 254, 259, 310/106, 114; 318/701

[56] References Cited

U.S. PATENT DOCUMENTS

| | | | |
|---|---|---|---|
| 3,956,678 | 5/1976 | Byrne | 310/216 |
| 4,506,182 | 3/1985 | Rohdin | 310/254 |
| 4,573,003 | 2/1986 | Lipo | 310/269 |
| 4,670,696 | 6/1987 | Byrne | 318/701 |
| 4,698,537 | 10/1987 | Byrne | 310/254 |
| 4,883,999 | 11/1989 | Hendershot | 310/254 |
| 4,896,088 | 1/1990 | Jahns | 318/701 |
| 4,933,620 | 6/1990 | MacMinn | 318/701 |

FOREIGN PATENT DOCUMENTS

50-37014  4/1975  Japan .

Primary Examiner—R. Skudy
Attorney, Agent, or Firm—Nikaido, Marmelstein, Murray & Oram

[57] ABSTRACT

This invention determines the configurations of a rotor (10) and a stator (12) and conductance periods and conductance phases of the conductance currents to obtain a smooth rotation of a variable reluctance motor as an AC servo motor. When the number of phases of a motor is m, the number of salient poles ($R_j$) of a rotor (10) is an integer n, and the number of salient poles ($S_k$) of a stator (12) is r·m, n is a whole multiple of r, and where the configuration of the stator salient pole ($S_k$) is rectangular and the configuration of the rotor salient pole ($R_j$) is sinusoidal, AC sine wave currents shifted by $2n\pi/(r \cdot m)$ each and having two times as large a period as that of a magnetic permeance fluctuation caused by a rotation of the rotor (10), are conducted to the phases of the motor.

6 Claims, 6 Drawing Sheets

VARIABLE RELUCTANCE TYPE AC SERVO MOTOR

TECHNICAL FIELD

The present invention relates to an AC servo motor of the variable reluctance type, more particularly it relates to an AC servo motor of the variable reluctance type which does not generate torque ripple.

BACKGROUND ART

In general, since a variable reluctance motor does not use magnets, as opposed to synchronous motors, it has a simple construction and may be cheaply fabricated. The method of use of this type of motor is as follows: The coil is wound around the poles of the stator; by passing a rectangular wave current, the poles of the stator are excited; the magnetic attraction force pulls the poles of the rotor and causes rotation.

Nevertheless, during rotation, a variable reluctance motor suffers from the problem of nonlinear changes in the magnetic permeance in accordance with the relative positions of the poles of the rotor and stator, and thus the generation of torque ripple. Further, rectangular wave currents include higher order high harmonics, and when the rotational speed becomes high, it is no longer possible to pass the required current due to the difference in the frequency response of the high harmonics. Therefore, it is difficult to use a variable reluctance motor for torque control, speed control, and position control.

DISCLOSURE OF THE INVENTION

Therefore, an object of the present invention is the provision of a variable reluctance motor able to be used as a servo motor free from the generation of torque ripple, thus solving the above problem.

In view of the above-mentioned object, there is provided a variable reluctance type AC servo motor characterized in that the number of salient poles of the rotor is n, the number of phases of at least three phases or more for exciting the salient poles of the stator is m, and the number of poles of the stator is r·m, the number of poles n being an integer, with the condition that r is not a whole multiple of the number r·m but is a whole multiple of the number r, the shape of the salient poles of the rotor changes sinusoidally in dimension in the longitudinal direction with respect to the direction position of the rotor, the shape of the salient poles of the stator is fixed in dimension in the longitudinal direction with respect to the circumferential direction position of the stator, the phase currents of the m phases exciting the stator poles are AC sine wave currents and have a period H2 two times the period of fluctuation of the magnetic permeance caused by rotation of the rotor, and the conductance phase between adjoining stator poles is shifted $2n\pi/(r·m)$ each in the phase of magnetic permeance fluctuation through the provision of current application means.

If the shape of the rotor poles is sinusoidal and the shape of the stator poles is band-like, i.e., rectangular, with a fixed width, the facing area of the rotor and stator during rotation of the rotor changes sinusoidally, whereby the magnetic permeance changes sinusoidally. In a motor of this construction, no torque ripple is generated if an alternating current with a period twice the period of fluctuation of the magnetic permeance is applied to the stator poles with the sine wave current shifted $2\pi/(r·m)$ each at the phases of the magnetic permeance fluctuation.

BRIEF DESCRIPTION OF THE DRAWINGS

FIG. 3b is a perspective view of a rotor of a motor of FIG. 3a;

FIG. 4 is a horizontal sectional view of a motor corresponding to FIGS. 3a, 3b which horizontal sectional view corresponds to the sectional position of the arrow line IV—IV of FIG. 3a.

FIG. 5b is a perspective view of a rotor of FIG. 5a; and

BEST MODE OF CARRYING OUT THE INVENTION

Figure 1:
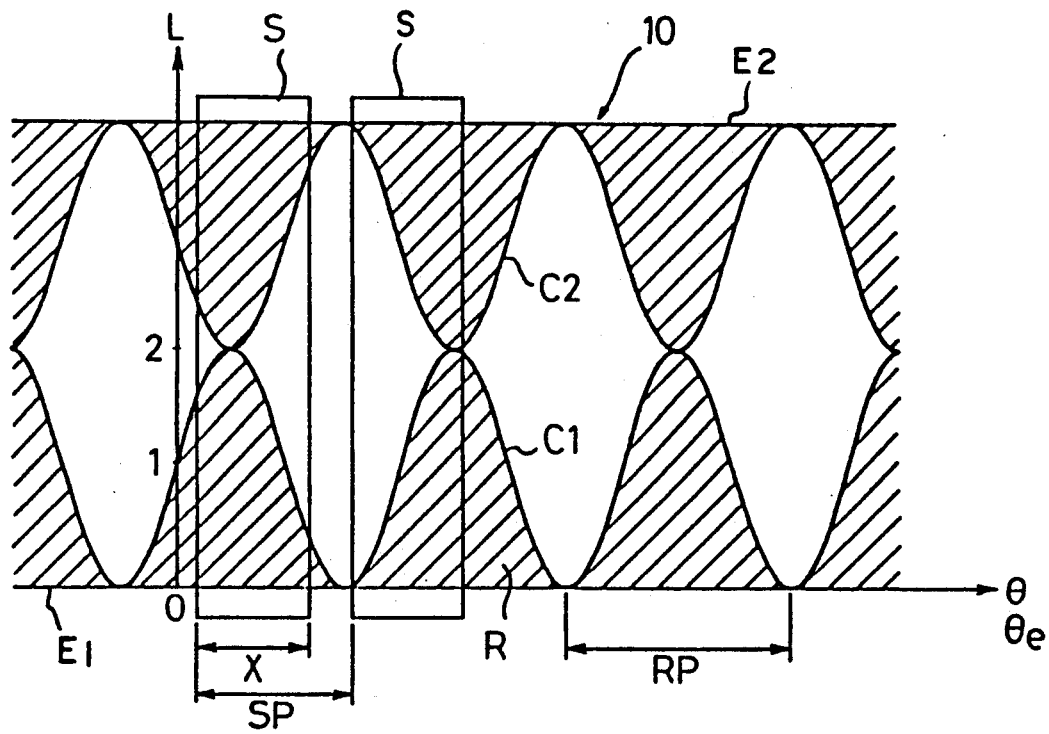
FIG. 1 is a schematically expanded partial development of a portion of superimposed surfaces of rotor and stator poles of a motor according to the present invention.
Figure 2:
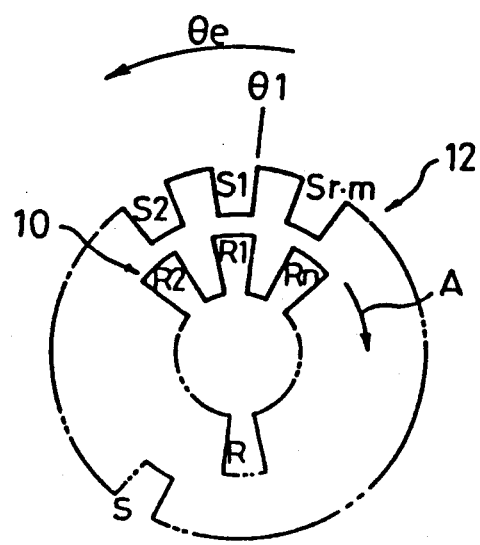
FIG. 2 is a schematic horizontal sectional view of a motor according to the present invention.

Below, a detailed explanation will be made of the present invention based on the embodiment shown in the attached figures. FIG. 2 is a schematic horizontal sectional view of a variable reluctance type motor according to the present invention, while FIG. 1 shows a development view of the shape of the inner peripheral surface area of stator salient poles S in comparison with the shape of the outer peripheral surface area of rotor salient pole R, by superposing developments of an expanded rotor 10 and two of the salient poles S of a stator 12. The hatched portions enclosed by the, curve C1 or C2 and the respective lines E1 and E2 representing the ends of the rotor 10 show the rotor poles R, where the outer surfaces of a number n (an integer of) rotor poles R are formed sinusoidally in the plane view of FIG. 1, i.e., the curves C1 and C2 are sine waves. Namely, the length dimension of the rotor poles R in the longitudinal direction L of the rotor 10 changes sinusoidally with respect to the position of the circumferential direction $\theta$ of the rotor 10. The rotor poles R may be only the hatched portions enclosed by the curve C1, but in FIG. 1 the rotor stator poles R include also the hatched portions enclosed by the sine wave C2 facing the sine wave C1 in the opposite direction in the length direction L. When the longitudinal direction L of the motor is longer, it is possible to provide, in parallel in the longitudinal direction, poles comprised of similar hatched portions having as external shapes the sine wave C1 or C2 shown in FIG. 1, and further possible to make the poles have, as an external shape, the sine wave obtained by multiplying the sine wave C1 several times in the longitudinal direction L. The condition required for all of the above modifications is that the length dimension in the longitudinal direction L changes sinusoidally with respect to the circumferential direction position $\theta$.

For example, in the case of FIG. 1, the requirement is that the change with respect to the circumferential direction position $\theta$ of the sum of the length dimensions in the hatched portions having as outer shapes the two curves C1 and C2 at the same circumferential direction position $\theta$ be sinusoidal. Since the sine wave is comprised of the curves C1 and C2 facing each other, and each curve C1 and C2 has the same pitch dimension RP, the above-mentioned condition is clearly satisfied.

On the other hand, if the number of phases of the excitation current is m, the number which equals r·m (where r is a natural number equal to or larger than two) of stator poles are disposed equiangularly on the stator. The pitch SP of arrangement of the stator poles is $2\pi/(r\cdot m)$, and the stator poles S as shown in FIG. 1 have rectangular external shapes; i.e., they have a fixed width dimension X ($0<X<SP=2\pi/(r\cdot m)$) of the circumferential direction $\theta$ and are provided in parallel in the longitudinal direction L without skew.

Below, an explanation will be made of the theoretical grounds of the present invention relating to a motor of the above-mentioned construction in the case of the poles R of the rotor 10 being treated only as the hatched portions surrounded by the sine wave curve C1, ignoring the sine wave curve C2. As also clear from the above explanation, even if the rotor poles R are only the hatched portions surrounded by the sine wave curve C1, the general applicability of the following theory is not lost.

The angular phase $\theta_e$ giving a $2\pi$ pitch RP of the sinusoidal curve C1 of the rotor poles R shown in FIG. 1 is hereafter referred to as the phase angle $\Gamma_e$. Unless otherwise specified, the variables are expressed in phase angles $\theta_e$. The origin O shown in FIG. 1 is set so that the sinusoidal curve C1 is expressed by a normalized $(1+\sin\theta_e)$. Below, it is assumed that the rotor 10 is fixed with respect to the coordinate $\theta_e$ and that the stator 12 moves relative to the rotor 10, but the general applicability is not lost. The facing area $A_k$ of the stator poles S and the rotor poles of the k-th stage is expressed by the following equation:

$$A_k = \int_{\theta_k}^{\theta_k + X} (1 + \sin\theta_e) \, d\theta_e \quad (1)$$
$$= X + 2\sin(X/2) \cdot \sin(\theta_1 + X/2)$$

where, $\theta_k = \theta_1 + \{2n\pi/(r\cdot m)\}\cdot(k-1)$ $\theta_1$: Phase angle of one side (side with smaller phase angle) of the stator pole S1 at the phase angle $\theta_e$, but since this changes along with the movement of the stator, it is given below as $\theta_e$.

$\theta_e$ is the phase angle of the position of the side of the stator poles S with the smaller phase angle, but the following condition is imposed from the condition that there be a $2\pi$ increase for each increase of the number k of the stator poles S of the same amount as the number of phases m:

n=r·i i=natural number

Equation (1) indicates that the maximum amplitude is given when the width X of the stator poles is the phase angle $\pi$. Where the pitch RP of the rotor poles is $2\pi$ and the width X of the salient pole of the stator is $\pi$ in the phase angle, the relationship of the same ratio 2 vs 1 is also held in an angle in the sense of a structural angle. Below, the description is based on X=$\pi$.

Therefore, the following equation is obtained.

$$A_k = \pi + 2\cos\{\theta_e + 2n\pi/(r\cdot m)(k-1)\} \quad (2)$$

In general, the magnetic permeance P is expressed by the following equation (3):

$$P = \mu O \cdot /Lg \quad (3)$$

where, $\mu O$: magnetic permeance rate of vacuum
A : facing area of poles
Lg: gap dimension (radial direction distance between rotor poles and stator poles)

By inserting the $A_k$ of equation (2) in place of the area A, equation (4) is obtained.

$$P = Pa + Pb \cdot \cos\theta_e$$
$$= Pa + Pb \cdot \cos\{\theta_e + 2n\pi/(r \cdot m) \cdot (k-1)\}$$

where, $Pa = \mu O \cdot \pi/Lg$ $Pb = \mu O \cdot 2/Lg$

That is, the magnetic permeance also changes sinusoidally. Even without using the condition of X =$\pi$, the magnetic permeance P of equation (4) can be derived. The actual magnetic permeance is obtained by multiplying by the coefficient for converting the area $A_k$ of equation (2) to the actual area of the rotor.

Next, the torque of the variable reluctance motor will be calculated.

$$Ue = \int V \cdot I dt \quad (5)$$

where,
Ue : power energy supplied to motor coil
V : voltage across terminals of coils
I : current flowing through coil $$W = \int T \cdot \omega dt \quad (6)$$

where,
W : mechanical work of motor
T : motor torque
$\omega$: rotor angular speed $$Um = (\tfrac{1}{2}) \cdot \phi \cdot I$$

where,
Um : magnetic energy for producing current flowing through coil
$\phi$: magnetic flux intercrossing coil The following equation stands from the principle of conservation of energy:

$$dUe = dW + dUm \quad (8)$$

Further, from the law of electromagnetic induction, the following equation (9) stands, and as the relationship between the phase angle $\theta_e$ and the structural angle $\theta$, equation (10) stands:

$$V = d\phi/dt \quad (9)$$

$$\theta_e = \theta \cdot n \quad (10)$$

If use is made of the above equation (5) to equation (10), the following equation (11) is derived:

$$T \cdot d\theta_e = (\tfrac{1}{2}) \cdot (I \cdot d\phi - \phi \cdot dI) \cdot n \quad (11)$$

Further, the relationship of the following equation (12) exists between the magnetic permeance P and the magnetic flux $\phi$:

$$\phi = N^2 \cdot P \cdot I \quad (12)$$

where, N : number of windings (now shown) of the one stator pole If equation (11) is considered as the torque equation for one stator pole alone, equation (12) is inserted into equation (11), and T is written as $T_k$ and I as $I_k$, the following equation (13) is obtained:

$$T_k = (\tfrac{1}{2}) \cdot N^2 \cdot I_k^2 \cdot (dP/d\theta_e) \cdot n \quad (13)$$

Next, the current $I_k$ flowing through the coil of the k-th stator pole S is expressed by the following equation (14):

$$I_k = IO \cdot \cos(\beta \cdot \theta_k + \alpha) \quad (14)$$

If equation (4) and equation (14) are inserted to equation (13), the following equation (15) is obtained:

$$T_k = -(n/2) \cdot N^2 \cdot IO^2 \cos^2(\beta \cdot \theta_k + \alpha) \cdot \sin\theta_k \quad (15)$$

From the condition that the torque obtained by adding the torque $T_k$ of equation (15) for 2·m poles (m is a fixed value not zero, the following equations are found:

$$\beta = \pm(\tfrac{1}{2}) \quad (16)$$

(i) When $\beta = \tfrac{1}{2}$
$$T = (r \cdot m \cdot n/8) \cdot N^2 \cdot IO^2 \cdot Pb \cdot \sin 2\alpha \quad (17)$$

(ii) When $\beta = -\tfrac{1}{2}$
$$T = -r \cdot m \cdot n/8 \cdot N^2 \cdot IO^2 \cdot Pb \cdot \sin 2\alpha \quad (18)$$

Note that in the process of the above calculation, the conditions are attached that $$m \neq 1, \; m \neq 2 \quad (19)$$

$$n \neq r \cdot m \cdot M \; (M: \text{natural number}) \quad (20)$$

In the case of $\beta = \tfrac{1}{2}$, from the condition for making the torque T maximum, it is determined that $$\alpha = \pm \pi/4 \quad (21)$$

When the values of $\alpha$ and $\beta$ are inserted into equation (14), the following equation is obtained:

$$I_k = IO \cdot \cos[(\tfrac{1}{2}) \cdot \{\theta_e + 2n\pi/(r \cdot m) \cdot (k-1)\} \pm \pi/4] \quad (22)$$

When $\alpha = \pi/4$, the stator 12 rotates in the positive direction of the phase angle $\theta_e$ relative to the rotor 10. In other words, looking at FIG. 2, this is the case where the rotor 10 rotates in the direction of the arrow line A. The case where $\alpha = -\pi/4$ is the opposite case. Note that when $\beta = -\tfrac{1}{2}$, the case where $\alpha = -/4$ is the case of the rotor 10 rotating in the direction of the arrow A, while the case of $\alpha = \pi/4$ is the reverse rotation. In these cases, the magnitude of the output torque T is expressed by the following equation:

$$|T| = (r \cdot m \cdot n/8) \cdot N^2 \cdot IO^2 \cdot Pb \quad (23)$$

From equation (22), it will be understood that it is necessary that the period H2 the sine wave current flowing at the stator poles S twice the period of fluctuation of the magnetic permeance and that the conduction phases between adjoining stator poles be shifted by $2n\pi/(r \cdot m)$ in the phase of the magnetic permeance fluctuation, that is, in the phase angle $\theta_e$.

Figure 3A:
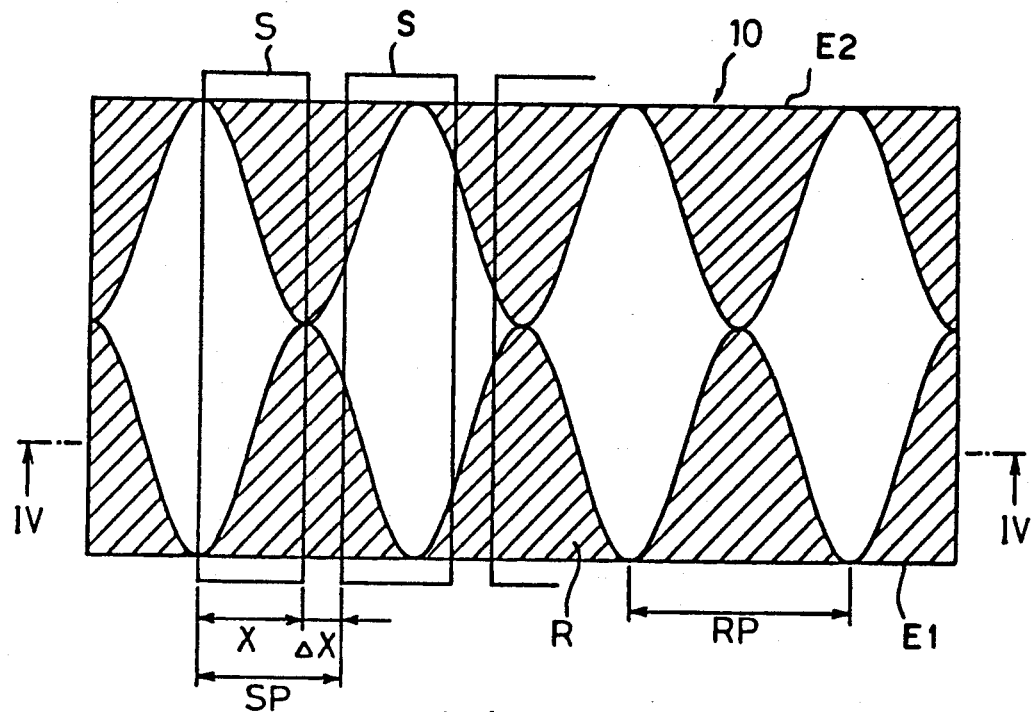
FIG. 3a is a schematically expanded development of pole surface of a motor according to the present invention in an embodiment using four rotor poles and a three phase current.
Figure 4:
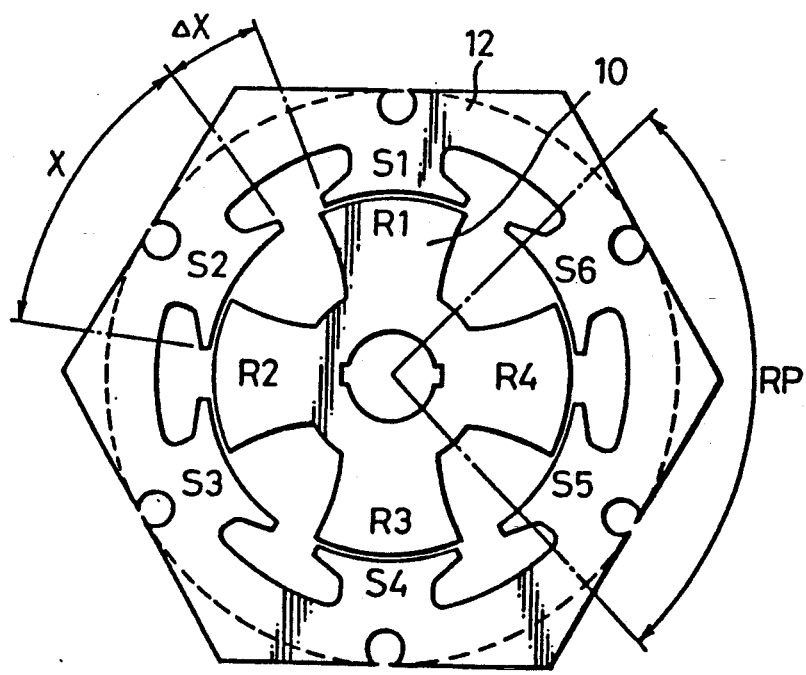
Figure 3B:
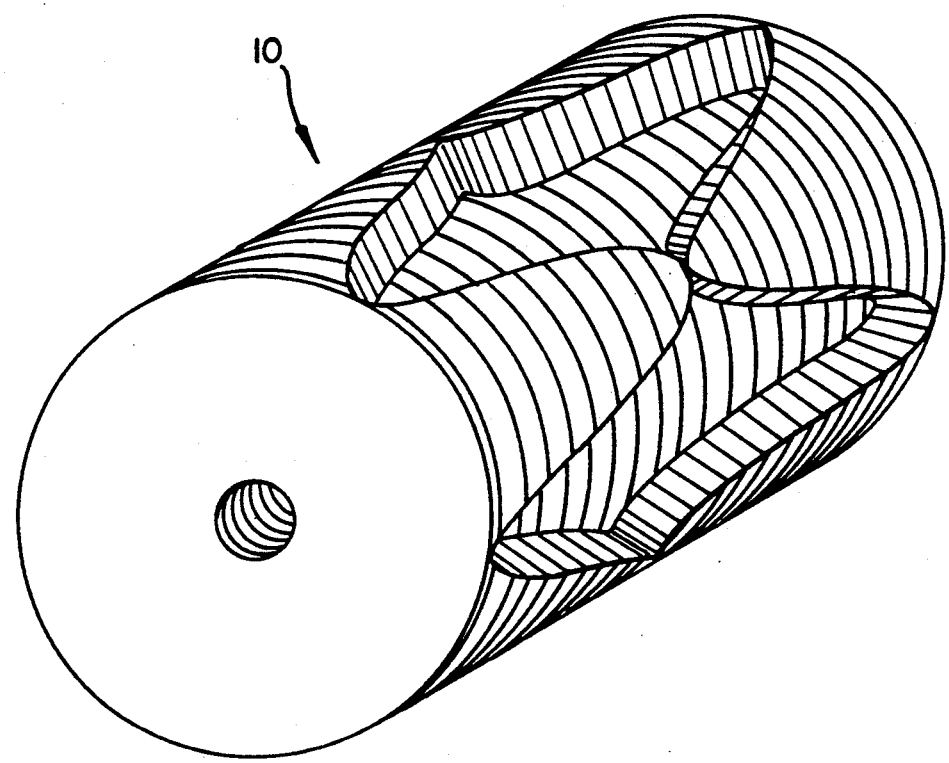

Next, FIG. 3a FIG. 3b and FIG. 4 illustrate the case of three phases (M=3), six stator poles (r·m=6), and four rotor poles (n=4). By the dual expression of the phase angle $\theta_e$ where one pitch RP of the rotor poles R of the rotor 10 is $2\pi$ and the actual structural angle $\theta$, the angular width RP of one rotor pole R of the rotor 10, the angular width X of one stator pole S of the stator 12, and the clearance angle $\Delta X$ between the stator poles are shown.

$$RP \ldots 2\pi(\theta_e), \; \pi/2(\theta)$$

$$X \ldots \pi(\theta_e), \; \pi/4(\theta)$$

$$\Delta X \ldots \pi/3(\theta_e), \; \pi/12(\theta)$$

The current applied to the stator poles S in this case is as follows.

$$I_k = IO \cdot \cos[(\tfrac{1}{2}) \cdot \{\theta_e + (4/3) \cdot \pi \; (k-1)\} + \pi/4]$$

Three phase AC sine wave currents shifted by $(4/3) \cdot \pi$ each in the phase angle $\theta_e$ and with a double period is applied to the stator poles S1, S2, ... and S6 in that order. For example, pairs are comprised of the stator poles S1 and S4, S2 and S5, and S3 and S6 and phase coils wound around the same.

Next, considering the construction of the rotor 10 by superposed thin plates, the rotor poles R illustrated and explained above must be formed by producing large numbers of different types of thin plates, which leaves room for improvement cost-wise. From this viewpoint, another embodiment displaying exactly the same action as the action of the rotor 10 in the above embodiment is shown in FIGS. 5a and 5b.

Figure 5A:
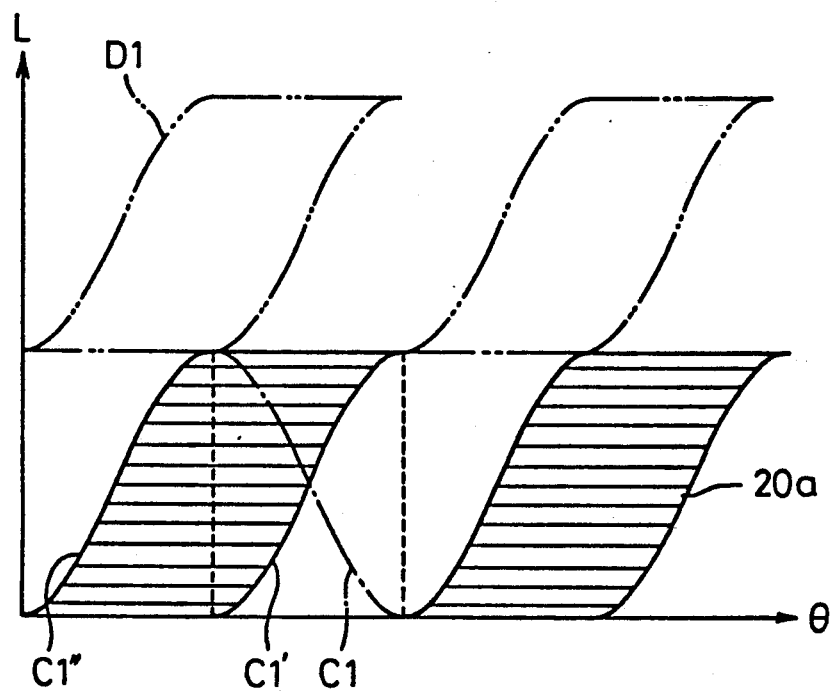
FIG. 5a is an expanded partial development of pole surfaces of another embodiment of a rotor according to the present invention.
Figure 6:
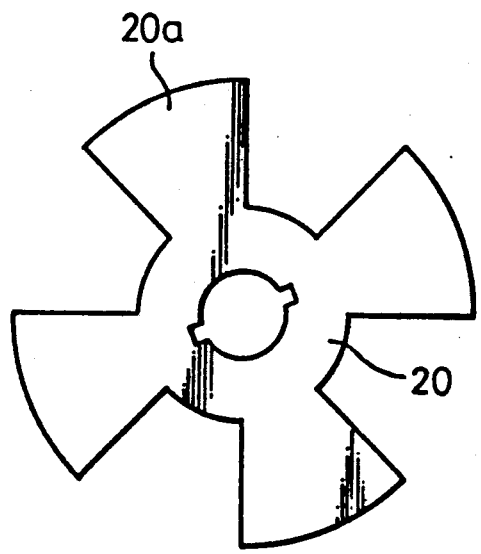
FIG. 6 is a front view of a thin element plate for superposition constructing the rotor shown in FIG. 5.
Figure 5B:
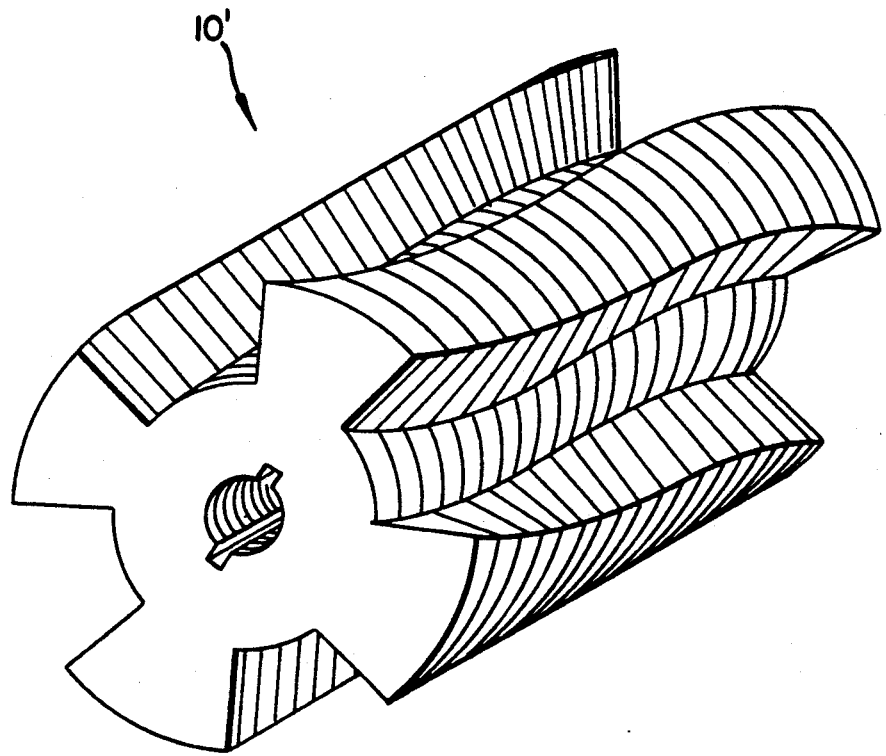
Figure 7:
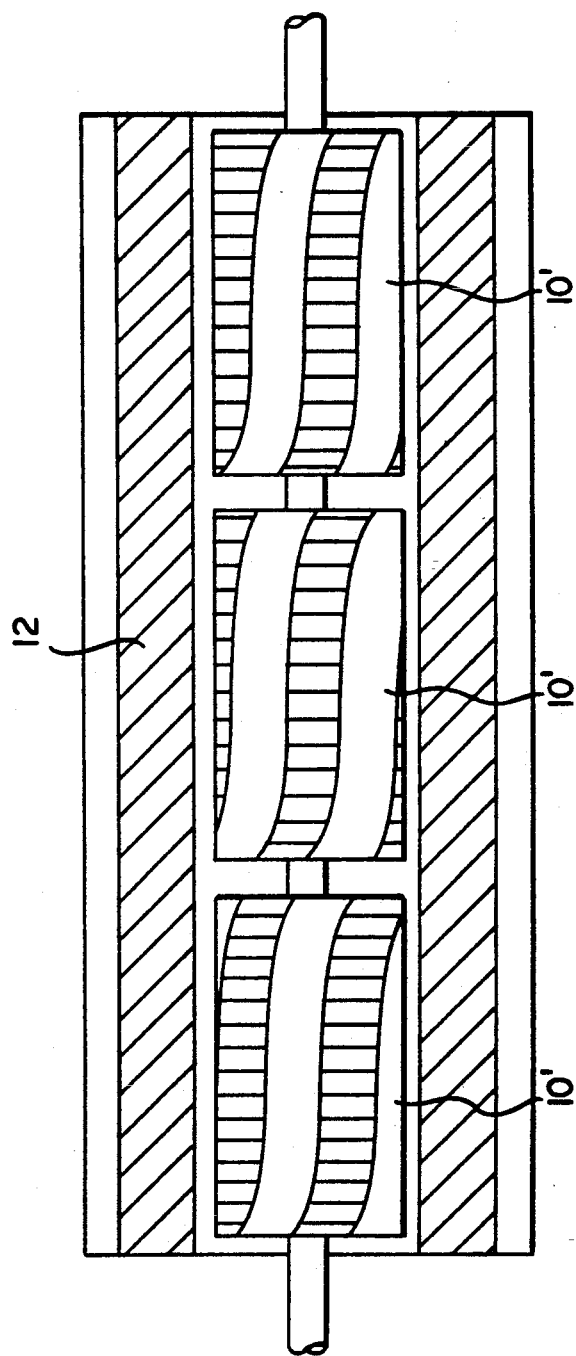
FIG. 7 is partial sectional view of a plurality of rotors.

FIG. 5a is a plane view showing the rotor, 10 in which the horizontal direction $\theta$ in the figure is the circumferential direction of the rotor and in which the vertical direction L is the longitudinal direction of the rotor. Of the sinusoidal curve C1 showing the outer shape of the rotor salient poles R shown in FIG. 1, the half at the circumferential direction $\theta$ of the rotor poles (portion shown by the dotted line in FIG. 5a) is inverted at the longitudinal direction L and made the sinusoidal curve shown by the solid line C1' in FIG. 5a, while the region enclosed by the remaining half of the sinusoidal curve C1, i.e., the sinusoidal curve C1'', and the above inverted sinusoidal curve C1, may be made the rotor poles. Even when composing the rotor in this way, the area facing the rectangular stator salient poles (not shown) laid in parallel with the longitudinal direction L has the same relationship exactly as the case of the embodiment shown from FIG. 1 to FIG. 4. Therefore, it is possible to eliminate the torque ripple. Regarding the thin plate 20 to construct the rotor poles, one may make one type of thin plate electromagnetic steel plate of the type shown in FIG. 6 in the case of n=4. The projections 20a of the thin plate 20 construct the rotor pole portions. In the case of superposing a plurality of thin plates 20, it is possible by manufacturing a jig of the shape of a sinusoidal curve C1' (or C1") in advance to quickly and accurately cause skewing sinusoidally in construction of the rotor. When constructing the rotor that is long in the longitudinal direction to obtain a large output torque, it is possible to use a plurality of such rotors in the longitudinal direction of the rotor as shown by the two-dot chain curve D1 in FIG. 5a, FIG. 5b shows a rotor constructed in this manner. A plurality of rotors can be installed in the stator as shown in FIG. 7.

As clear from the above explanation, according to the present invention, it is possible to completely eliminate the torque ripple of motors of the variable reluctance type and it is possible to use a variable reluctance type motor as a servo motor. In this case, the conductance current is a completely sinusoidal current, and thus a high harmonic component is not included.

We claim:

1. A variable reluctance type AC servo motor comprising:
   a stator having a plurality of salient poles, each said stator salient pole having a substantially rectangular surface area;
   a rotor having a plurality of salient poles opposing said stator salient poles, each said rotor salient pole having a surface area opposing said stator salient poles shaped such that, upon rotation of said rotor, the surface area of each rotor salient pole opposing a stator salient pole varies continuously in a sinusoidal manner; and
   means for applying AC singe wave excitation currents to windings of said stator poles;
   wherein the number of m of phases of excitation currents is at least 3, the number of poles of said rotor is an integer n and the number of poles of said stator is r·m, n being a whole multiple of the number r but not a whole multiple of r·m; and
   wherein the m phase currents have a period Hz equal to twice a period of fluctuation of magnetic permeance caused by rotation of the rotor, and a conductance phase between adjoining stator poles is shifted 2n π/(r·m) at each phase of magnetic permeance fluctuation, whereby torque ripple is eliminated.

2. A variable reluctance type AC servo motor according to claim 1, wherein the number n of said rotor salient poles is equal to at least the number m of phases, sinusoidal variation of surface area of a rotor salient pole opposing the stator salient pole has a pitch dimension RP in a circumferential direction of said rotor, and each stator salient pole has a dimension in a circumferential direction equal to RP 2.

3. A variable reluctance type AC servo motor according to claim 1, wherein said rotor is constructed of a plurality of superposed identical plate members, each of which plate members is formed with a number n of angularly equi-spaced projecting portions of equal width in a circumferential direction, and wherein adjacent said plate members are skewed with respect to each other in a longitudinal direction said rotor such that said projecting portions form said rotor salient poles wherein a surface area opposing each stator salient pole varies sinusoidally as said rotor rotates.

4. A variable reluctance type AC servo motor according to claim 2, wherein said rotor is constructed of a plurality of superposed identical plate members, each of which plate members is formed with a number n of angularly equi-spaced projecting portions of equal width in the circumferential direction, and wherein adjacent plate members are skewed with respect to each other in a longitudinal direction of said rotor such that said projecting portions form said rotor salient poles wherein a surface area opposing each stator salient varies sinuosidally as said rotor rotates.

5. A variable reluctance type AC servo motor according to claim 3, wherein said motor includes a plurality of said rotors arranged longitudinally of said rotor.

6. A variable reluctance type AC servo motor according to claim 4, wherein said motor includes a plurality of said rotors arranged longitudinally of said motor.

* * * * *